April 16, 1968  C. VAN DER LELY  3,377,789
LATERAL DISPLACEMENT OF CROP LYING ON THE GROUND
Filed Dec. 28, 1964  2 Sheets-Sheet 2
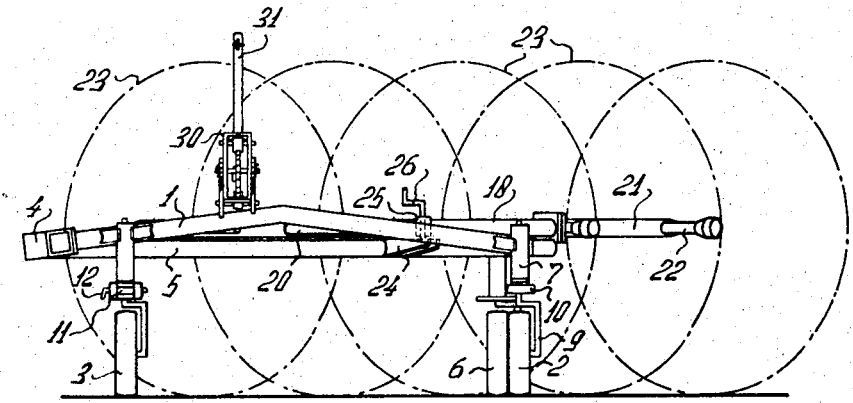
FIG. 2
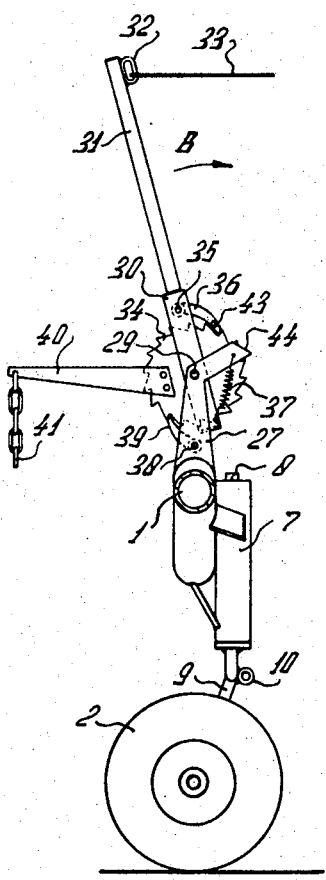
FIG. 3
FIG. 4
INVENTOR.
CORNELIS VAN DER LELY
BY
Mason, Mason & Albright
Attorneys United States Patent Office 3,377,789
Patented Apr. 16, 1968

3,377,789
LATERAL DISPLACEMENT OF CROP
LYING ON THE GROUND
Cornelis van der Lely, Zug, Switzerland, assignor to Texas
Industries Inc., Willemstad Curacao, Netherlands
Antilles, a limited-liability company of the Netherlands
Antilles
Filed Dec. 28, 1964, Ser. No. 421,191
Claims priority, application Netherlands, Jan. 24, 1964,
64—528
7 Claims. (Cl. 56—377)

ABSTRACT OF THE DISCLOSURE

This invention is an implement in which the frame includes a plurality of supporting beams and agricultural implements attached to supports on one or more of the beams. At least one of the frame beams is pivotable with respect to the remainder of the frame and at least some of the implements are connected to the pivotable beam so that the implements can be raised or lowered by pivoting part of the frame. A lifting mechanism connects one of the frame beams to a support for lifting the implements.

---

This invention relates to implements for the lateral displacement of crop lying on the ground, such implements being of the kind comprising a frame supported by at least three ground wheels and a plurality of rake wheels arranged in a row.

In accordance with the invention there is provided an implement of the kind set forth, wherein the frame comprises a frame beam extending transversely of the intended direction of operative travel and located near the foremost rake wheel of the row, which beam has two castor ground wheels connected thereto, one of which wheels is located near to and forwardly of said foremost rake wheel and each of which wheels has a mounting provided with coupling means adapted for connection with a draw bar.

For a better understanding of the invention and to show how the same may be readily carried into effect, reference will now be made, by way of example, to the accompanying drawings in which:

FIG. 2 is a front view of the implement shown in FIG. 1,

FIG. 3 shows, to an enlarged scale, a lifting mechanism by means of which the height above the ground of the rake wheels of the implement may be varied, and FIG. 4 shows, to an enlarged scale, a mechanism by means of which fine adjustments may be made for the height of the rake wheels relative to the ground surface.

Figure 1:
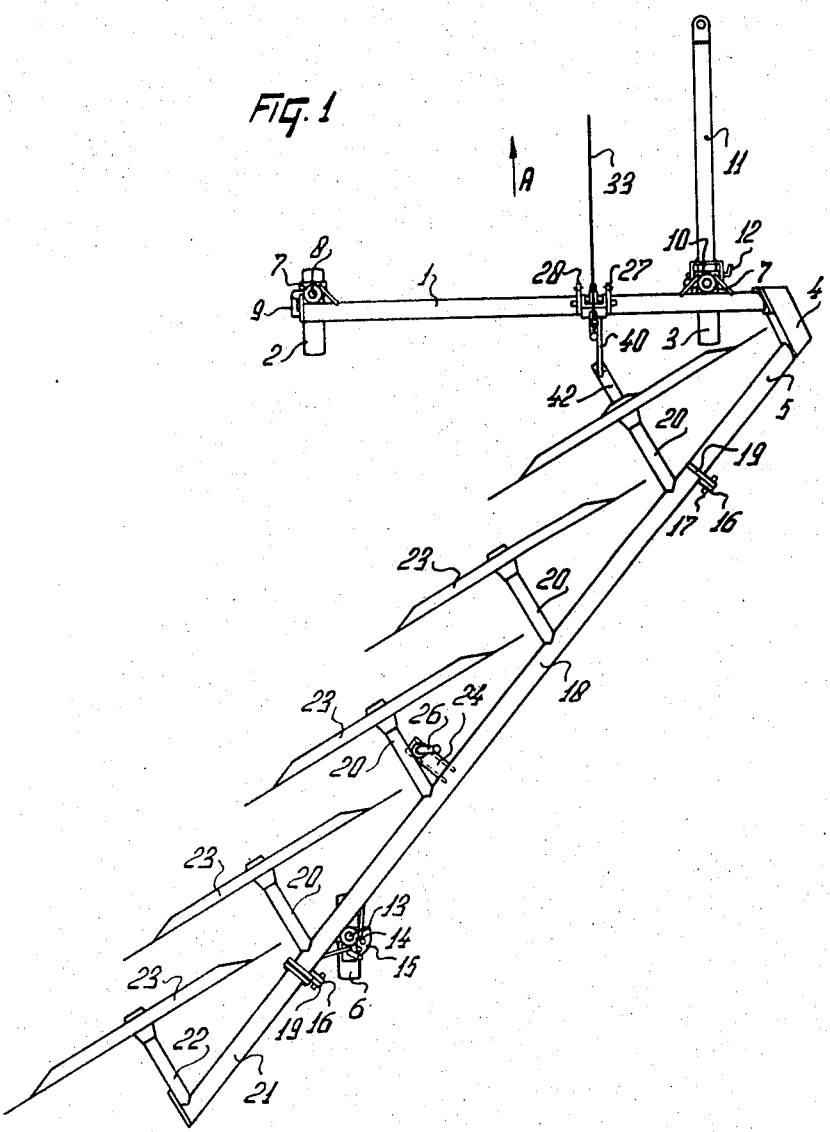
FIG. 1 is a plan view of a raking implement in accordance with the invention.

Referring now to the drawings, the frame of the implement comprises a frame beam 1 which has a castor ground wheel 2 mounted on one end and a castor ground wheel 3 mounted near the opposite end. A connecting member or block 4 is bolted to the end of the frame beam 1 near the ground wheel 3, said block 4 being of square cross-section. A frame beam 5 is connected to the block 4 at its end remote from its connection with the frame beam 1. A ground wheel 6 is mounted on the frame beam 5 near the end of said frame beam remote from the block 4.

The connections between the castor wheels 2 and 3 and the frame beam 1 comprise vertical sleeves 7 secured to the frame beam 1, in which sleeve vertical shafts 8 are freely turnable. The shafts 8 are connected with horizontal axles, about which the castor wheels 2 and 3 are rotatable, through inclined rods 9. A connecting bracket 10 is fastened to each of the rods 9 and is adapted to receive a draw bar 11 which can be pivotally mounted therein by means of a locking pin 12 entered through aligned holes formed in the bracket 10 and draw bar 11.

The ground wheel 6, which is connected to the frame beam 5, is rotatably mounted on a horizontal axle which is connected with a vertical shaft 13 journalled in a sleeve 14 by means of a support rod which comprises two perpendicularly disposed portions. The sleeve 14 is secured to the frame beam 5. The plane of rotation of the ground wheel 6 can be retained in a number of different angular settings relative to the frame by inserting a pin in any one of a number of holes formed in a locking member 15. Two lugs 16 are secured to the frame beam 5 and are spaced apart from each other therealong. A frame beam 18 is mounted above the frame beam 5 and carries two lugs 19 spaced apart from each other by a distance slightly greater than that between the two lugs 16 on the frame beam 5. The lugs 19 and 16 are pivotally connected together by means of pins 17 entered through aligned holes formed in the lugs. Thus the frame beam 18 is pivotally connected to the frame beam 5.

The frame beam 18 is located vertically above the frame beam 5 and carries four parallel rake wheel support members 20 which are rigidly secured thereto. An extension beam 21 is detachably connected with the frame beam 18 at its rearmost end with respect to the intended direction of operative travel A. The beam 21 carries a rake wheel support member 22 which extends parallel to the support members 20 and is rigidly secured to the free end of the frame beam 21. Rake wheels 23 are rotatably mounted on the support members 20 and the support member 22. A support bracket 24 is rigidly secured to the frame beam 5 and extends perpendicular thereto (FIG. 4). One of the support members 20 carries a screw-threaded sleeve 25 which receives a screw-threaded crank 26 whose lower end, in normal operation, bears against the support bracket 24. Thus rotation of the crank 26 will cause the support member 20 associated therewith to be raised or lowered and consequently pivot the frame beam 18 about the pins 17. In this manner a fine adjustment of the height of the rake wheels relative to the ground may be obtained, the crank 26 thus constituting an adjustable stop.

A fork having limbs 27 and 28 extending parallel to each other is secured to the frame beam 1 (FIGS. 1 and 3). A pivot pin 29 extending horizontally and parallel to the frame beam 1, is journalled in said limbs 27 and 28. A rectangular bracket 30 is turnably mounted on the pin 29 and has a lever arm 31 secured to one end. The end of the lever arm 31 remote from the bracket 30 is provided with an eye 32 which receives one end of a rope 33. A ratchet wheel 34 is turnably mounted on the pin 29 and has two limbs of the bracket 30 extending on either side of it. A pin 35 which extends parallel to the pin 29 is mounted in the bracket 30 near its connection with the lever arm 31. A pawl 36 co-operates with the ratchet wheel 34 and is pivotally mounted on the pin 35. Springs 37 extend between inclined arm portions 44 of the limbs 27 and 28 and the bracket 30 and act in such a way that when the tension in the rope 33 is released, the lever arm 31 and bracket 30 are urged to pivot in an anti-clockwise direction as seen in FIG. 3.

A pawl 39 is pivotally mounted between the limbs 27 and 28 on a pivot pin 38. A spring (not shown) urges the free end of the pawl 39 into engagement with one of the teeth of the ratchet wheel 34. An arm 40 is rigidly connected to the ratchet wheel 34 and has a chain 41 fixed to its free end. The other end of the chain 41 is linked to a connecting member or prolongation 42 of the support member 20 which carries the foremost rake wheel 23. The disposition of the pins 17 affording the pivotal axis of the beam 18, the adjustable stop 26 and the point of application of the chain 41 to the prolongation 42 is such that the stop 26 is located approximately midway between the first and last mentioned members when viewed in a direction parallel to the pivotal axis.

The operation of the implement will now be described. The implement is adapted to be moved in the direction of the arrow A by means of the draw bar 11 which is hitched at its forward end to a tractor or like propelling vehicle. The draw bar 11 may be connected with the castor wheel 2 or 3 according to the operational conditions required. Thus if it is intended to gather crop lying on the left hand side of the tractor, then the draw bar 11 is connected with the coupling bracket 10 at the castor wheel 3, but alternatively if it is intended to gather crop lying on the right hand side of the tractor, then the draw bar 11 is connected with the castor wheel 2. Since both the ground wheels 2 and 3 are castor wheels, either can act as a steering wheel when the draw bar 11 is connected thereto. The working width of the implement can be varied by adjusting the angular setting of the ground wheel 6. This is done by removing the pin from the locking member 15 and entering it in a suitable one of the holes formed in the member 15. The contact pressure and/or relative height between the rake wheels and the ground can be varied by turning the crank 26 which raises or lowers the support member 20 associated therewith and thus pivots the frame beam 18 about the pins 17 and hence raises or lowers all the rake wheels 23.

During forward travel of the implement the rake wheels are caused to rotate by reason of their contact with the ground or crop and hence they will displace crop to one side into a single swath or windrow. As seen in FIG. 2, the frame beam 1 is of inverted V-shaped form, the limbs of the V being gently inclined to the horizontal so that crop can readily pass under the frame beam 1 without interference. The connection block 4 is secured to the frame beams 1 and 5 by means of bolts and provides a rugged connection therebetween. The frame beams 1 and 5 are inclined to each other at an angle of about 50°.

The rake wheels 23 of the implement can be raised by the driver of the tractor or like vehicle which is towing the implement by pulling the rope 33. This causes the lever arm 31 to be turned in the direction of the arrow B which thus causes the ratchet wheel 34 also to be rotated in the same direction because of the engagement of the pawl 36 with its teeth. Turning of the ratchet wheel 34 in the direction B causes the end of the arm 40 to be raised. Thus the chain 41 raises the prolongation 42 of the foremost rake wheel support member 20, which movement causes the frame beam 18 to pivot about the pins 17 and hence raise the rake wheels 23.

When the driver stops pulling on the rope 33, the lever arm 31 and bracket 30 will be caused to turn in a direction opposite to that of the arrow B by the springs 37. However, the ratchet wheel 34 is prevented from rotating by the pawl 39 which engages therewith. If the rope 33 is subsequently pulled again, the ratchet wheel 34 will again be turned in the direction of the arrow B and the rake wheels will be raised still further from the ground. However if the lever arm 31 is caused to turn about the pin 29 sufficiently far in the direction of the arrow B, then a transverse pin 43 fixed to the free end of the pawl 36 associated with the bracket 30 will come into engagement with the inclined arm portions 44 of the limbs 27 and 28. The ends of the arms 44 are so shaped that the pin 43 in engagement therewith urges the pawl 36 out of engagement with the ratchet wheel 34. Simultaneously with this operation, a lower transverse end member of the bracket 30 comes into contact with the pawl 39 and urges it out of engagement with the ratchet wheel 34. After this simultaneous disengagement of the pawls 36 and 39, the ratchet wheel 34 is free to rotate about the pin 29 and, under the action of the weight of the rake wheels 23 and associated supporting members, the ratchet wheel 34 turns in a direction opposite to the arrow B so that the rake wheels can then re-occupy a suitable operation position.

The castor wheel 3 is located near the foremost rake wheel and lies on a line passing through all the rake wheels. Thus the castor wheel 3 and foremost rake wheel undulate substantially simultaneously over unevenness in the ground so that satisfactory engagement of the crop or ground by the rake wheels is obtained.

Owing to the relatively large length of the lever arm 31 and also to the to and fro movement which may be employed several times in order to raise the rake wheels, a comparatively small effort is required to raise the rake wheels. The raising operation is also assisted by the relatively large distance between the point of application of the upward force, namely the chain 41 to the prolongation 42, and the pivotal axis of the frame beam 18, which axis is afforded by the pins 17.

What I claim is:

1. An agricultural implement comprising a frame, said frame having a first frame beam (1) extending substantially transverse to the direction of travel, a second frame beam (5) being connected with its front end to an end of said first frame beam (1) and extending obliquely to the rear from said first frame beam, ground wheels attached to said two frame beams near the ends of said first frame beam and the rearmost end of said second frame beam, a third frame beam (18) extending substantially parallel to said second frame beam and being coupled to said second frame beam by hinge means (16, 17, 19) defining a pivotal axis which extends substantially parallel to said second frame beam, supports (20) fixed to said third frame beam, rake wheels mounted on said supports and a lifting mechanism operatively associated with said third beam for adjusting the relative height of said third beam with respect to said first frame beam, whereby said supports and rake wheels can be raised and lowered by turning said third frame beam about said pivotal axis.

2. An implement as claimed in claim 1, wherein a central region of said first frame beam is located at a higher level than the opposite ends thereof.

3. An implement as claimed in claim 1, wherein the first and second frame beams are inclined to each other at an angle of about 50°.

4. An implement as claimed in claim 1, wherein said second and third frame beam are located behind said rake wheels and said wheels are mounted in overlapping relationship.

5. An implement as claimed in claim 1, wherein the lifting mechanism is located forwardly of the rake wheels with respect to the intended direction of travel and said mechanism is coupled to said third beam through one of said supports.

6. An implement as claimed in claim 5, wherein said first frame beam has the lifting mechanism secured thereto, said lifting mechanism being connected with an extension of the support of the foremost rake wheel.

7. An implement as claimed in claim 5, wherein said lifting mechanism comprises a lever turnable about a pivot pin and a pawl pivotally connected thereto, said pawl being adapted for cooperation with a ratchet wheel rotatably mounted on said pivot pin, said ratchet wheel having an arm rigidly fixed thereto and connected with one of said supports, whereby during operation thereof, turning of the lever in a first direction causes the ratchet wheel to rotate in the same direction and raise the rake wheels, a second pawl being provided for locking said ratchet wheel against rotation when said lever is turned in an opposite direction to the first mentioned direction, means for urging said pawls out of engagement with said ratchet wheel when said lever reaches a predetermined angular setting about said pivot pin.

References Cited

UNITED STATES PATENTS

| | | | |
|---|---|---|---|
| 2,924,060 | 2/1960 | Van der Lely et al. | 56—377 |
| 3,004,378 | 10/1961 | Van der Lely et al. | 56—377 |
| 3,031,834 | 5/1962 | Van der Lely et al. | 56—366 |
| 3,050,926 | 8/1962 | Van der Lely et al. | 56—377 |
| 3,091,907 | 6/1963 | Van der Lely et al. | 56—377 |

ANTONIO F. GUIDA, *Primary Examiner.*

ABRAHAM G. STONE, RUSSELL R. KINSEY,
*Examiners.*